(12) United States Patent
Nagaishi et al.

(10) Patent No.: US 7,801,428 B2
(45) Date of Patent: Sep. 21, 2010

(54) SHOT IMAGE DISPLAY SYSTEM, IMAGE RECEIVING DEVICE, CONTROL METHOD FOR IMAGE RECEIVING DEVICE, AND SERVER

(75) Inventors: Michihiro Nagaishi, Okaya (JP); Kazuhiro Sakamoto, Shiojiri (JP)

(73) Assignee: Seiko Epson Corporation (JP)

( * ) Notice: Subject to any disclaimer, the term of this patent is extended or adjusted under 35 U.S.C. 154(b) by 814 days.

(21) Appl. No.: 11/685,253

(22) Filed: Mar. 13, 2007

(65) Prior Publication Data

US 2007/0217774 A1    Sep. 20, 2007

(30) Foreign Application Priority Data

Mar. 14, 2006    (JP) .............................. 2006-068557

(51) Int. Cl.
G03B 17/00    (2006.01)
G03B 13/30    (2006.01)
G03B 17/18    (2006.01)
H04N 5/228    (2006.01)

(52) U.S. Cl. ............................ 396/55; 396/56; 396/147; 348/208.99

(58) Field of Classification Search .................... 396/55
See application file for complete search history.

(56) References Cited

U.S. PATENT DOCUMENTS

| 7,260,270 B2 | 8/2007 | Kusaka | 382/275 |
| 7,356,254 B2 * | 4/2008 | Aoyama | 396/147 |
| 7,599,568 B2 * | 10/2009 | Aoyama | 382/255 |
| 2003/0184667 A1 * | 10/2003 | Aoyama | 348/333.12 |

FOREIGN PATENT DOCUMENTS

| JP | H07-36423 | 2/1995 |
| JP | 11-196397 | 7/1999 |
| JP | 2000-156849 | 6/2000 |
| JP | 2002-27050 | 1/2002 |
| JP | 2002-112100 | * 4/2002 |
| JP | 2004-248171 | 9/2004 |

* cited by examiner

*Primary Examiner*—Melissa J Koval
(74) *Attorney, Agent, or Firm*—Harness, Dickey & Pierce, P.L.C.

(57) ABSTRACT

A shot image display system includes a shooting device for transferring a shot image and blur produced at the time of shooting, and an image receiving device for receiving the shot image and blur transmitted from the shooting device. The image receiving device includes a blur correcting unit for executing blur correction for the received shot image based on the received blur, and a display unit for displaying the shot image corrected by the blur correcting unit.

5 Claims, 4 Drawing Sheets

SHOT IMAGE DISPLAY SYSTEM, IMAGE RECEIVING DEVICE, CONTROL METHOD FOR IMAGE RECEIVING DEVICE, AND SERVER

BACKGROUND

1. Technical Field

The present invention relates to a shot image display system which receives and displays shot images, an image receiving device, and a control method for the image receiving device, and a server.

2. Related Art

A cellular phone having a videophone function which provides an image of a person connected by phone as well as ordinary voice communication is known (for example, see JP-A-2002-27050). In case of videophone communication where the image shooting side and the image receiving side are discrete devices, blurred images are displayed on the image receiving side due to blurs caused on the shooting side or the receiving side. It is particularly difficult to clearly display small characters by videophone.

According to a known image blur preventing technique used in a projector which projects images on a screen, blurs of the projector side and the screen or audience side are separately detected, and at least the position of either side is physically shifted to correct blurs (for example, see JP-A-7-36423).

However, the system structure which uses the related-art image blur preventing technique is large-sized since a mechanism for physically shifting the projector and the screen or audience is required. It is therefore difficult to apply this technique to portable devices such as a videophone.

SUMMARY

It is an advantage of some aspects of the invention to provide a shot image display system capable of reducing blurs of images on the image receiving side without complicating structure, an image receiving device, and a control method for the image receiving device, and a server.

A shot image display system according to a first aspect of the invention includes: a shooting device for transferring a shot image and blur produced at the time of shooting; and an image receiving device for receiving the shot image and blur transmitted from the shooting device. The image receiving device includes a blur correcting unit for executing blur correction for the received shot image based on the received blur, and a display unit for displaying the shot image corrected by the blur correcting unit.

According to the first aspect of the invention, the image receiving device executes the blur correction for the received shot image based on the blur received by the image receiving device and displays the corrected shot image. Thus, the shot image containing reduced blur can be displayed on the receiving side with decreased processing load on the transmitting side. Moreover, the structure is less complicated than that of the related-art image blur preventing device which requires the physical shift mechanism.

In this case, it is preferable that the image receiving device includes a blur detecting unit for detecting its own blur, and that the blur correcting unit obtains the difference between the received blur and the blur detected by the blur detecting unit, and executes the blur correction for the received shot image based on the difference. In this structure, the image receiving device executes the blur correction for the received shot image based on the difference between the received blur and the blur of the image receiving device. Thus, images containing reduced blur can be displayed on the receiving side under the condition where blur is generated from either or both of the shooting device and the image receiving device.

A shot image display system according to a second aspect of the invention includes: a shooting device for correcting blur of a shot image and transmitting the corrected shot image; and an image receiving device for receiving the shot image transmitted from the shooting device. The image receiving device includes a blur detecting unit for detecting its own blur, a blur correcting unit for executing blur correction for the received shot image based on the blur detected by the blur detecting unit, and a display unit for displaying the shot image corrected by the blur correcting unit.

According to the second aspect of the invention, the shooting device transmits the shot image after blur correction, and the image receiving device executes blur correction for the received shot image based on the blur of the image receiving device and then displays the corrected shot image. Thus, images containing reduced blur can be displayed on the receiving side under the condition in which blur is generated from either or both of the shooting device and the image receiving device. Moreover, the structure is less complicated than that of the related-art image blur preventing device which requires the physical shift mechanism.

A shot image display system according to a third aspect of the invention includes: a shooting device for transmitting a shot image and blur produced at the time of shooting via a communication network; an image receiving device for receiving the shot image via the communication network and displaying the shot image; and a server provided for the communication network. The server performs blur correction for the received shot image based on the blur transmitted from the shooting device, and transmits the corrected shot image to the image receiving device.

According to the third aspect of the invention, the server executes the blur correction for the received shot image based on the blur transmitted from the shooting device, and transmits the corrected shot image to the image receiving device. Thus, images containing reduced blur can be displayed on the receiving side with decreased processing load applied to the shooting device and the image receiving device. In addition, the structure is less complicated than that of the related-art image blur preventing device which requires the physical shift mechanism.

In this case, it is preferable that the image receiving device includes a blur detecting unit for detecting its own blur and a blur correcting unit for executing the blur correction for the received shot image based on the blur detected by the blur detecting unit, and that the image receiving device displays the shot image corrected by the blur correcting unit. In this structure, images containing reduced blur can be displayed on the receiving side under the condition in which blur is generated from either or both of the shooting device and the image receiving device.

An image receiving device according to a fourth aspect of the invention includes: a receiving unit for receiving a shot image and blur produced at the time of shooting from a device in communication; a blur correcting unit for executing blur correction for the received shot image based on the received blur; and a display unit for displaying the shot image corrected by the blur correcting unit.

According to the fourth aspect of the invention, the Image receiving device executes the blur correction for the received shot image based on the blur received from the device in communication and displays the corrected shot image. Thus, images containing reduced blur can be displayed on the receiving side with decreased processing load applied to the device in communication in addition, the structure is less complicated than that of the related-art image blur preventing device which requires the physical shift mechanism.

In this case, it is preferable that a blur detecting unit for detecting blur of the image receiving device is included, and that the blur correcting unit obtains the difference between the received blur and the blur detected by the blur detecting unit and executes the blur correction for the received shot image based on the difference. In this structure, the image receiving device executes the blur correction for the received shot image based on the difference between the received blur and the blur of the image receiving device. Thus, images containing reduced blur can be displayed on the receiving side under the condition in which blur is generated from either or both of the device in communication and the image receiving device.

In this case, it is preferable that the blur detecting unit is a gyro sensor or an acceleration sensor. Also, it is preferable that the image receiving device is formed as a portable videophone including a shooting unit for shooting an image, a transmitting unit for transmitting the shot image to the device in communication, and a communication unit for providing voice communication with the device in communication. in this structure, images containing reduced blur can be displayed on the receiving side in case of videophone.

A control method of an image receiving device for receiving a shot image and blur produced at the time of shooting from a device in communication and displaying the shot image according to a fifth aspect of the invention includes executing blur correction for the received shot image based on the received blur and displaying the corrected shot image.

According to the fifth aspect of the invention, the image receiving device executes the blur correction for the received shot image based on the received blur and displays the corrected shot image. Thus, images containing reduced blur can be displayed on the receiving side with decreased processing load applied to the device in communication. In addition, the structure is less complicated than that of the related-art image blur preventing device which requires the physical shift mechanism.

In this case, it is preferable that the control method further includes: detecting blur of the image receiving device; obtaining the difference between the received blur and the detected blur; and executing the blur correction for the received shot image based on the difference.

In this structure, the image receiving device executes the blur correction for the received shot image based on the difference between the received blur and the blur of the image receiving device. Thus, images containing reduced blur can be displayed on the receiving side under the condition in which blur is generated from either or both of the device in communication and the image receiving device.

A server provided for a communication network to receive a shot image from a shooting device and transmit the shot image to an image receiving device according to a sixth aspect of the invention receives a shot image and blur produced at the time of shooting from the shooting device, performs blur correction for the shot image based on the blur, and transmits the corrected shot image to the image receiving device.

According to the sixth aspect of the invention, the server executes the blur correction for the received shot image based on the blur transmitted from the shooting device and transmits the corrected shot image to the image receiving device. Thus, images containing reduced blur can be displayed on the receiving side with decreased processing load applied to the shooting device and the image receiving device. In addition, the structure is less complicated than that of the related-art image blur preventing device which requires the physical shift mechanism.

According to the shot image display system, the image receiving device, the control method for the image receiving device, and the server of the aspects of the invention, images containing reduced blur can be displayed on the receiving side without complicated structure.

BRIEF DESCRIPTION OF THE DRAWINGS

The invention will be described with reference to the accompanying drawings, wherein like numbers refer to like elements.

DESCRIPTION OF EXEMPLARY EMBODIMENTS

An embodiment according to the invention is hereinafter described in detail with reference to the drawings.

Figure 1:
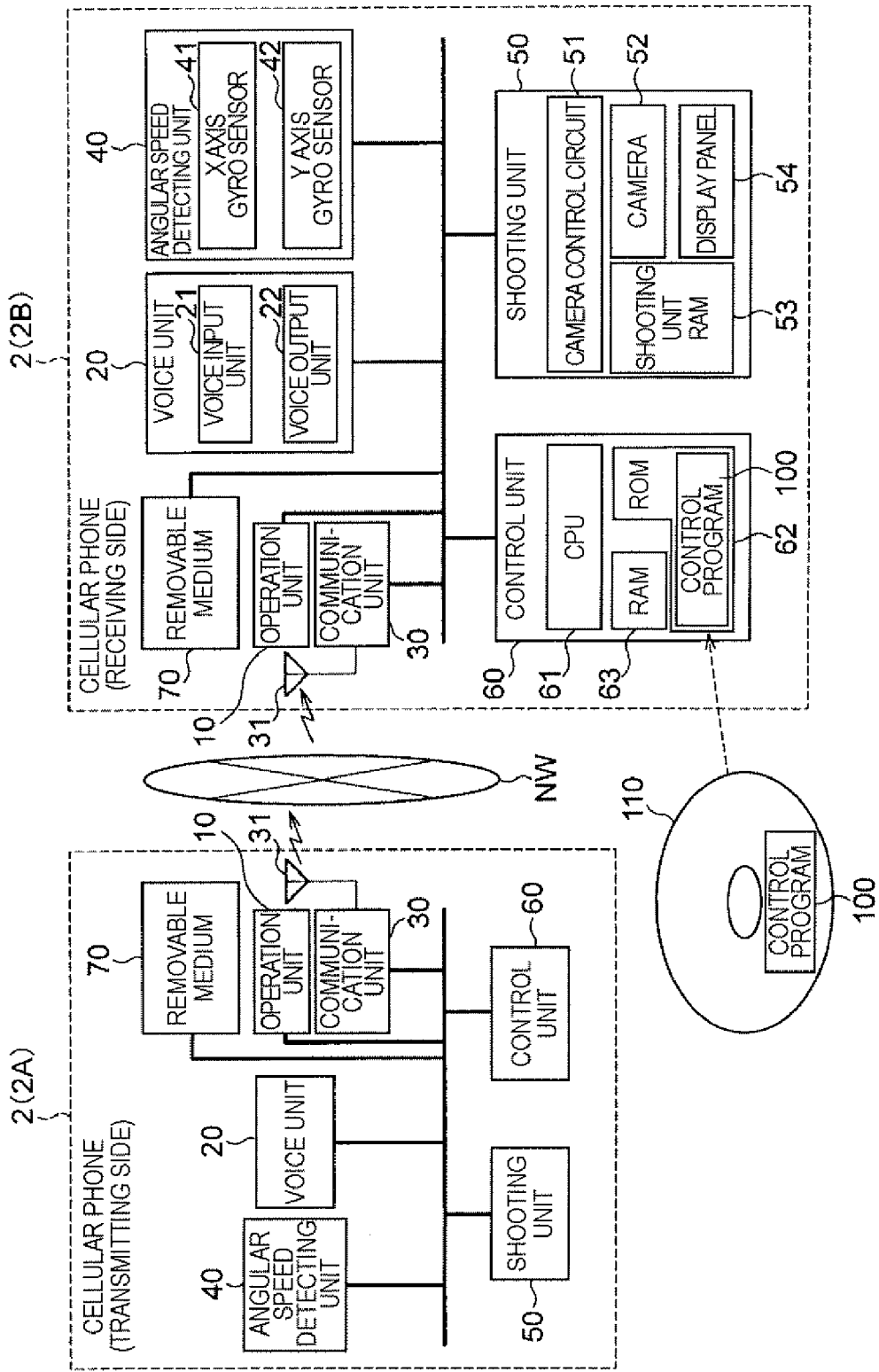
FIG. 1 illustrates a structure of a shot image display system according to an embodiment of the invention.

FIG. 1 illustrates a structure of a shot image display system according to an embodiment of the invention.

A shot image display system 1 is a system for providing telephone or videophone communication between cellular phones 2 via a mobile communication network NW. In this figure, the structures of the cellular phones 2 are chiefly shown. The cellular phones 2 can communicate with an ordinary telephone connected with a fixed telephone communication network (not shown) via the mobile communication network NW similarly to related-art cellular phones.

Each of the cellular phones 2 has substantially the same structure. For simplifying explanation, one of the cellular phones 2 is expressed as a transmitting device 2A (corresponding to shooting device) and the other cellular phone as a receiving device 2B (corresponding to image receiving device) in case of one-to-one communication by videophone. When distinction between these devices is not particularly needed, they are expressed as cellular phones 2.

The cellular phone 2 has an operation unit 10, a voice unit 20, a communication unit 30, an angular speed detecting unit 40, a shooting unit 50, and a control unit 60. A removable medium 70 is detachably attached to the cellular phone 2.

The operation unit 10 informs the control unit 60 about operations of a plurality of operators contained in the cellular phone 2. The voice unit 20 functions as a voice communication unit used for voice communication with the other cellular phone 2 or other ordinary telephones, and has a voice input unit 21 and a voice output unit 22. The voice input unit 21 has a microphone for collecting voices of the user of the cellular phone 2, and the voices inputted through the microphone are outputted to the control unit 60. The voice output unit 22 has a speaker for releasing voices to the user of the cellular phone 2, and the synthesized voices of the cellular phone such as the receipt sound and the voices sent from the person connected by phone are released through the speaker.

The communication unit 30 provides radio communication with the other cellular phone 2 or others via an antenna 31 in accordance with the communication system specified by the mobile communication network NW, and has an RF unit, a baseband processing unit and others.

Figure 2:
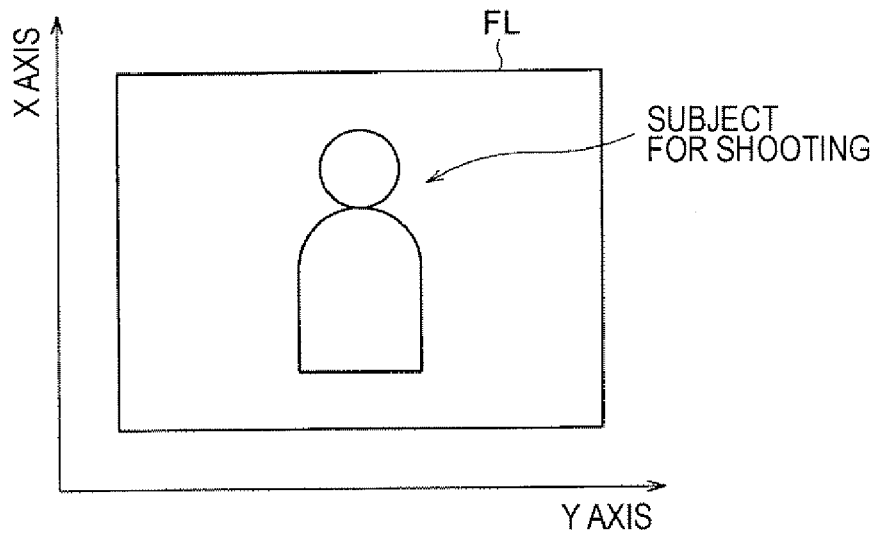
FIG. 2 illustrates a relation between a frame and a blur axis.

The angular speed detecting unit 40 functions as a blur detecting unit for detecting blur of the cellular phone 2. As understood by reference to FIG. 2, the angular speed detecting unit 40 has an X axis gyro sensor 41 for detecting angular speed in the up-and-down direction (hereinafter defined as X axis) of a frame FL of the shooting target, and a Y axis gyro sensor 42 for detecting angular speed in the left-and-right direction (hereinafter defined as Y axis) of the frame FL. The angular speed detecting unit 40 produces angular speed detecting signals SV indicating voltages in correspondence with the respective angular speeds in the X and Y axes by using the two gyro sensors 41 and 42, and outputs the angular speed detecting signals SV to the control unit 60.

The shooting unit 50 functions as a shooting unit for shooting dynamic images and still images, and has a camera control circuit 51, a camera 52, a shooting unit RAM 53, and a display panel 54. The camera control circuit 51 controls the respective units of the shooting unit 50 under the control of the control unit 60. The camera 52 sequentially outputs shot data D1 to the camera control circuit 51 at a predetermined sampling rate. The camera 52 has an image sensor constituted by photoelectric conversion elements such as CCDs and CMOSs disposed in matrix or in honeycomb, an optical lens system constituted by a plurality of optical lenses, a lens driving unit for executing zooming, focusing, diaphragming and other processes by driving the optical lens system, an A/D conversion circuit for converting analog signal images acquired by the image sensor into digital signal images and outputting image data, and other components.

The shooting unit RAM 53 functions as a buffer for temporarily storing shot data. The display panel 54 functions as a display unit for displaying various types of information such as shot images and set screens, and is constituted by a flat display panel such as a liquid crystal display panel and an organic EL panel, for example. The removable medium 70 stores shot data and the like.

In this structure, the camera control circuit 51 applies predetermined processing to the shot data D1 outputted from the camera 52. Then, the shot data D1 is temporarily stored in the shooting unit RAM 53, and stored in the removable medium 70 when the shot image is desired to be retained. The shot data stored in the shooting unit RAM 53 is used for the display on the display panel 54, and transmitted by radio to the other cellular phone 2 (2B) via the communication unit 20 in case of videophone. The shot data stored in the removable medium 70 is used for the display (reproduction) of the shot images.

Figure 3:
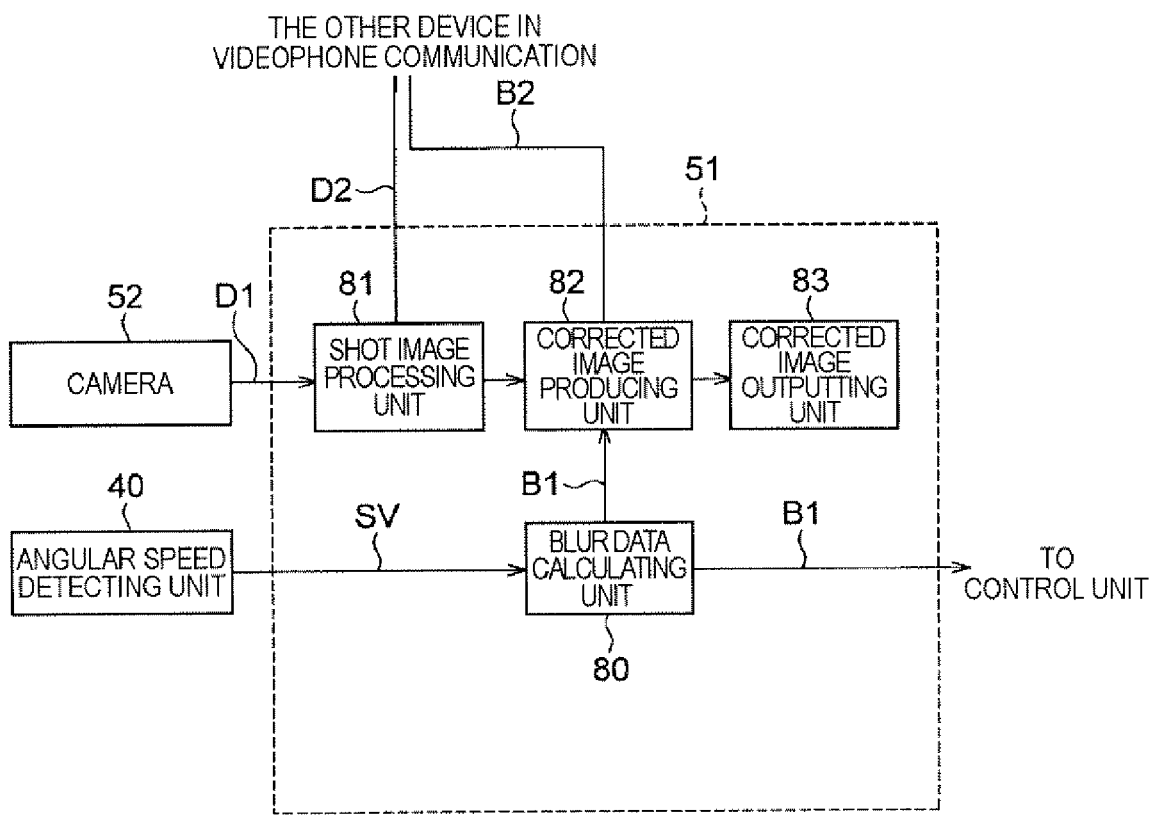
FIG. 3 is a block diagram showing a camera control circuit.

FIG. 3 is a block diagram showing the camera control circuit 51.

The camera control circuit 51 has a blur data calculating unit 80, a shot image processing unit 81, a corrected image producing unit 82, and a corrected image outputting unit 83.

The blur data calculating unit 80 performs calculation for the angular speed detecting signals SV outputted from the angular speed detecting unit 40, acquires blur data B1 corresponding to blur in the sampling cycle of the shot data D1, and selectively outputs the blur data B1 to the corrected image producing unit 82 or the control unit 60. Thus, the blur data calculating unit 80 obtains the blur data B1 for each frame of the shot data D1.

The blur data B1 may be information about angular speed, or may be information about deviation (such as dot number) on the frame calculated from the focal length of the camera 52 or the distance between the camera 52 and the subject for shooting. It is preferable that the blur data B1 contains basic data showing shooting conditions such as the focal length of the camera 52 and the distance between the camera 52 and the subject when information on angular speed is transmitted as the blur data B1.

The shot image processing unit 81 receives the shot data D1 sent from the camera 52 or shot data D2 transmitted from the other cellular phone 2 (2A) via the communication unit 30 and inputs the shot data D1 or D2 to the shooting unit RAM 53 for storing therein. The corrected image producing unit 82 functions as a blur correcting unit for executing blur correction for the shot data stored in the shooting unit RAM 53. The corrected image producing unit 82 receives the blur data B1 acquired by the blur data calculating unit 80 or receives both the blur data B1 and blur data B2 transmitted from the other cellular phone 2 (2A) via the communication unit 30 in case of videophone, and executes blur correction for the shot data stored in the shooting unit RAM based on the blur data B1 or both B1 and B2.

The corrected image outputting unit 83 outputs the corrected shot data when blur correction is executed, or the shot data not corrected when blur correction is not executed, to the display panel 54 or other components.

The control unit 60 functions as a computer for controlling the respective parts of the cellular phone 2. As illustrated in FIG. 1, the control unit 60 has a CPU 61 for executing various programs and calculations, a rewritable flash ROM (hereinafter abbreviated as "ROM") 62 for storing a control program 100 to be executed by the CPU 61 and various data, and a RAM 63 as a work area for temporarily storing calculation results of the CPU 61and various data. The control program 100 stored in the ROM 62 contains a blur correction program for videophone. This blur correction program corrects blur in dynamic image display.

The control program 100 can be recorded on a recording medium 110 (see FIG. 1) constituted by a magnetic recording medium, an optical recording medium, a semiconductor recording medium or the like from which a computer can read data, and can be distributed in the form of the recording medium 110. It is also possible to store the control program 100 in the ROM 62 by connecting the cellular phone 2 and a personal computer via a cable or the like for communication therebetween and outputting the control program 100 read from the recording medium 110 by the personal computer to the cellular phone 2.

The operation performed in the blur correction program for videophone is now discussed. This blur correction program is performed during videophone communication. The operation of the cellular phone 2 at the time of videophone communication is extremely unique in that the cellular phone 2 transmits both shot data and blur data indicating blur during shooting by the cellular phone 2 to the other cellular phone 2 in communication, and receives both shot data and blur data indicating blur during shooting by the other cellular phone 2 from the other cellular phone for correcting blur caused when the camera is not held steadily for the received shot images. In other aspects, the operations for mutually transmitting and receiving voices and dynamic images (shot images) to provide communication by videophone are substantially the sane as the operations of known cellular phones.

These operations are performed by both the cellular phones 2 connected by videophone, but only the case in which the transmitting device 2A transmits the shot data D2 and the blur data B2 to the receiving device 2B via the mobile communication network NW and the receiving device 2B receives the shot data D2 and the blur data B2 is now discussed in detail for simplifying the explanation.

Figure 4:
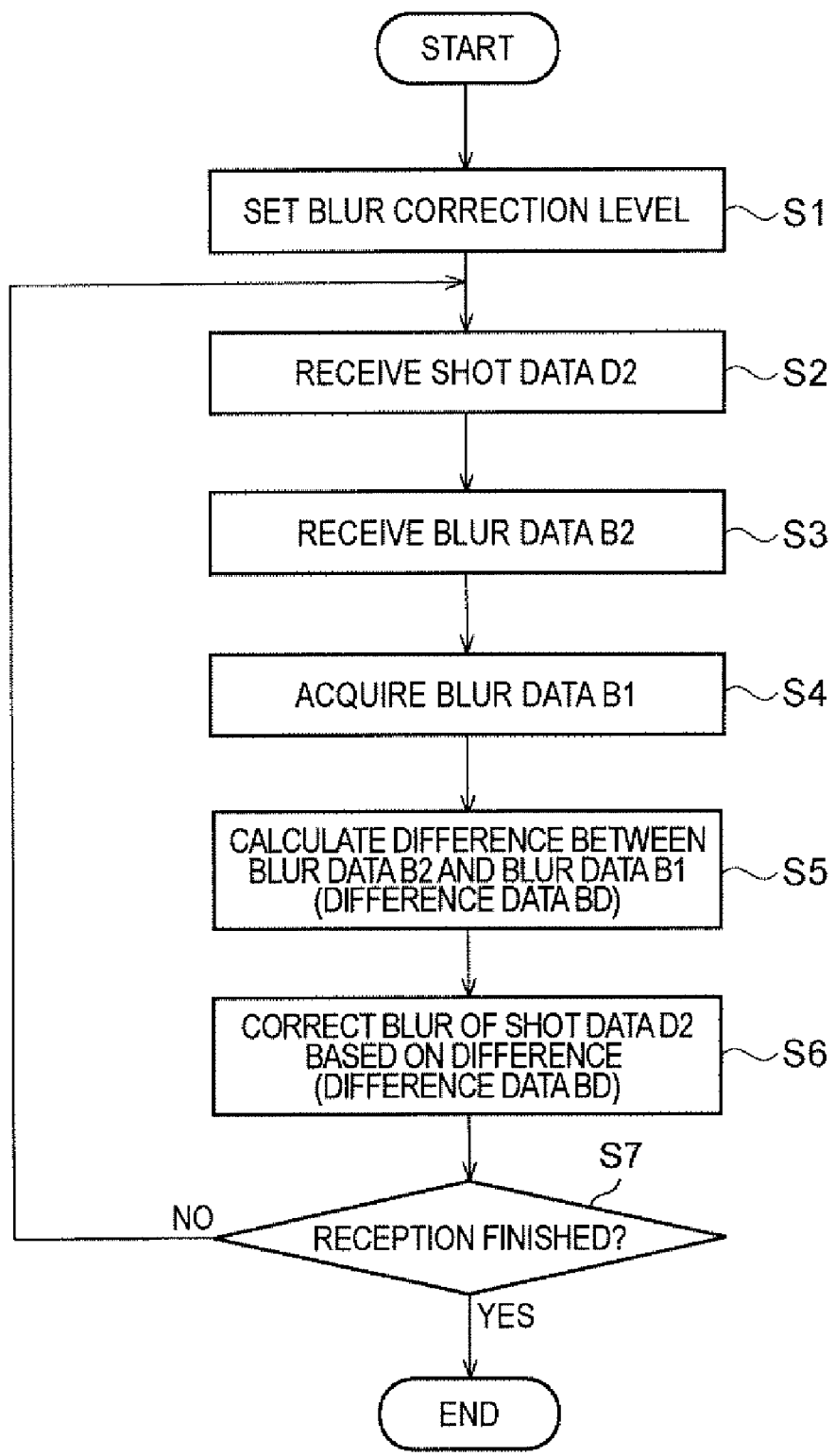
FIG. 4 is a flowchart showing an operation of a receiving device.

FIG. 4 is a flowchart showing the operation of the receiving device 2B performed in the blur correction program. It is assumed that the shot data D2 of dynamic images without blur correction and the blur data B2 during shooting are transmitted from the transmitting device 2A to the receiving device 2B by real-time processing.

Initially, the control unit 60 of the receiving device 2B sets a blur correction level at the start of videophone (step S1). This blur correction level is determined by the user, and the control unit 60 varies the contents of the blur correction to be performed by the camera control circuit 51 according to the established blur correction level.

More specifically, the blur correction level is divided into three steps of "low", "middle", and "high" in this embodiment. When the "high" level is selected, blur caused when the camera is not held steadily is corrected by analyzing the movements of frames and the subject with reference to images in a plurality of frames contained in the shot data and correcting images by methods such as image shift so that those movements can be eliminated. When the "middle" level is selected, easy blur correction such as decreasing the frame rate and lowering the resolution is executed. When the "low" level is selected, blur correction is not performed. Thus, the processing load of blur correction decreases as the blur correction level lowers.

Then, the control unit 60 starts receiving the shot data D2 and the blur data B2 from the transmitting device 2A in communication (steps S2 and S3), and initiates blur acquisition process (step S1) so as to obtain the blur data B1 of the receiving device 2B from the angular speed detecting signal SV of the angular speed detecting unit 40. In this case, the control unit 60 also starts acquiring the shot data D1 from the camera 52 of the receiving device 2B, and transmits the shot data D1 and the blur data B1 to the transmitting device 2A via the communication unit 30.

When the control unit 60 receives the shot data D2 and the blur data B2 from the transmitting device 2A, the control unit 60 subtracts the blur data B1 from the blur data B2 to obtain difference data BD indicating the relative blur volume between the transmitting device 2A and the receiving device 2B (step S5). When the blur data B2 of the transmitting device 2A contains the angular speed information and the basic data (focal length and distance to subject in shooting), it is preferable to calculate the deviation on the frame from the information contained in the blur data B2 and determine the difference between this deviation and the deviation on the frame calculated from the blur data B1 of the receiving device 2B as the difference data BD.

Subsequently, the control unit 60 performs blur correction for the received shot data D2 based on the difference data BD obtained from the camera control circuit 51 so as to correct blur according to the relative blur volume between the transmitting device 2A and the receiving device 2B (step S6) Thus, the control unit 60 and the camera control circuit 51 function as a blur correcting unit in this embodiment.

As discussed above, the contents of the blur correction differ depending on the blur correction level. When the blur correction is set at the "high" level, blur correction which accurately eliminates the relative blur volume between the transmitting device 2A and the receiving device 2B is executed. As a result, shot images containing no relative blur are obtained.

When the blur correction is set at the "middle" level, easy blur correction such as decreasing the frame rate and lowering the resolution to such an extent that the blur becomes unnoticeable is executed in accordance with the relative blur volume between the transmitting device 2A and the receiving device 2B. As a result, shot images having only unnoticeable blur are obtained with reduced processing load.

When the blur correction is set at the "low" level, blur correction is not executed. Thus, unnecessary processing load of blur correction is not applied when few blur is generated from both the transmitting device 2A and the receiving device 2B or when the users do not care about blurs.

Then, the control unit 60 judges whether the data reception from the transmitting device 2A in communication (reception of shot data D2 and blur data B2) is completed or not (step S7), that is, whether the videophone is finished or not. When it is determined that the videophone is not finished (step S7: NO), the flow returns to step S2 to execute blur correction for the next frame in the shot data D2. When it is determined that the videophone is finished (step S7: YES), the flow ends.

In this structure, the processes from step S2 through step S6 are sequentially and cyclically repeated during communication by videophone. Thus, the blur correction for eliminating the relative blur volume between the transmitting device 2A and the receiving device 2B is executed for each frame of the shot data D2 transmitted from the transmitting device 2A in communication, and images of the shot data D2 after correction are displayed on the display panel 54. When blur is generated only from the transmitting device 2A, images after correction of the blur of the transmitting device 2A are displayed. When blur is generated only from the receiving device 2B, images with few blur are displayed even under the condition where the receiving device 2B is producing blur. When blur is generated from both the transmitting device 2A and the receiving device 2B, images with few blur are displayed even under the condition where the receiving device 2B is producing blur. Thus, the user of the receiving device 2B can visually recognize images without blur even when either or both of the transmitting deice 2A and the receiving device 2B generate blur.

Accordingly, in this embodiment, the receiving device 2B receives both the shot data D2 and the blur data B2 from the transmitting device 2A in communication and executes blur correction for the shot data D2 based on the difference between the blur data B2 of the transmitting device 2A and the blur data B of the receiving device 2B. Thus, when either or both of the transmitting device 2A and the receiving device 2B generate blurs, images without blurs can be displayed for the user of the receiving device 2B (image receiving side). Accordingly, the apparent resolution increases, and small characters contained in the shot images can be clearly shown.

According to this structure, only the receiving device 2B performs blur correction. Thus, the processing load applied to the transmitting device 2A is reduced. More specifically, in case of videophone which transmits and receives images in both directions for image display, blur of shot data to be transmitted is not required to be corrected. Accordingly, the processing load on the transmitter side is reduced, and thus real-time image display can be more easily achieved.

According to this structure, blur correction for shot images is executed by image processing. Thus, the number of components is reduced compared with the related-art image blur preventing device which requires the mechanism for detecting blur of the projector, the screen or the like and the mechanism for physically shifting the projector, the screen or the like. Accordingly, the structure is not complicated.

This contributes to easy reduction of the size and width of the cellular phones. When the small-sized gyro sensors 41 and 42 are used, the size and width can be further reduced.

According to this structure, the correction level can be set by the user, and the processing load of the blur correction decreases as the blur correction level lowers. Thus, when both the transmitting device 2A and the receiving device 2B generate few blurs, unnecessary blur correction which produces processing load is not performed.

When the processing load of the blur correction is heavy, the frame rate of the shot images after correction decreases and so-called frame omission occurs in some cases According to this structure, however, the processing load of the blur correction can be reduced by lowering the blur correction level on the user side. Thus, dynamic images with no frame omission or with reduced frame omission can be displayed.

The blur correction level may be automatically set based on the past records established by the user, or on the relative blur volume (difference data BD) between the transmitting device 2A and the receiving device 2B or others. In this case, when it is judged that the camera 52 of the transmitting device 2A is a wide-angled camera giving a long distance from the subject for shooting by reference to the basic data transmitted from the transmitting device 2A, for example, the blur correction level may be set at the "low" level which does not perform blur correction since blur during shooting images is scarcely recognized even when comparatively large relative blur volume is produced.

APPLICATION EXAMPLE

According to the embodiment discussed above, the receiving device 2B detects its own blurs and executes blur correction for shot images transmitted from the transmitting device 2A in communication based on the difference between the blur of the transmitting device 2A and the blur of the receiving device 25. However, blur correction may be performed for shot images from the transmitting device 2A in communication based on only the blur volume of the transmitting device 2A without detection of the blur volume of the receiving device 2B. In this case, the processing load on the receiving side can be reduced.

In the above embodiment, it is possible that the transmitting device 2A executes blur correction for images shot by the transmitting device 2A based on the blur detected by the transmitting device 2A and transmit the shot images after blur correction to the receiving device 2B. In this case, the receiving device 2B may perform blur correction correcting its own blur for the received shot images, or display the received shot images without executing blur correction. By this method, the receiving device 2B can display images after correcting blur of the transmitting device 2A while reducing the processing load applied to the receiving device 2B.

Figure 5:
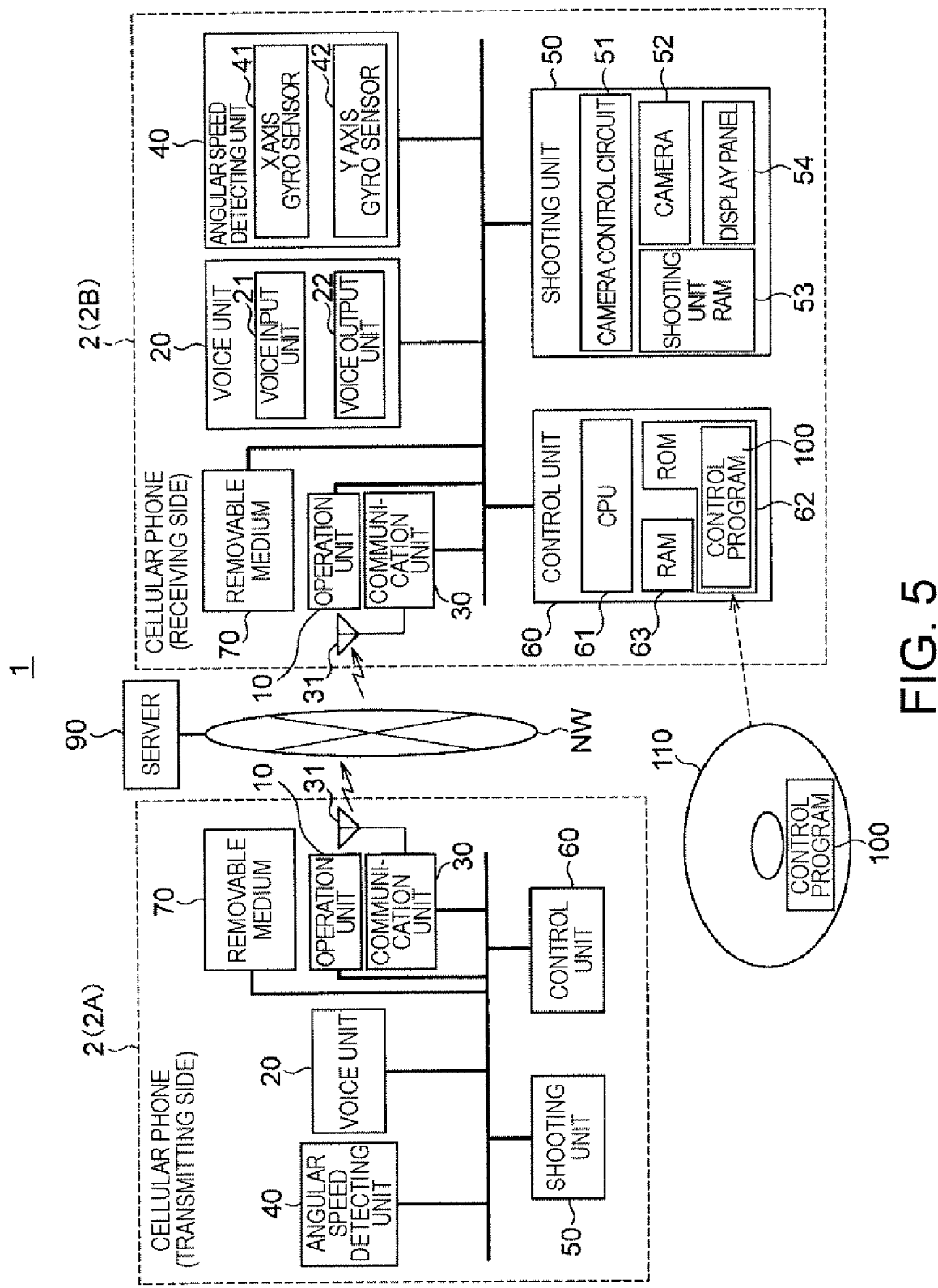
FIG. 5 illustrates a shot image display system in a modified example.

According to the above embodiment, either the receiving device 2B or the transmitting device 2A performs blur correction. However, as illustrated in FIG. 5, a server 90 connected with the mobile communication network NW may receive shot images and blur transmitted from the transmitting device RA, and execute blur correction for the received shot images. Then, the server 90 may transmit the corrected shot images to the receiving device 2B. In this case, the receiving device 2B may perform blur correction for correcting its own blur for the received shot images, or may display the received shot images without executing blur correction.

In this structure, since the server 90 executes blur correction, the processing load applied to the cellular phones 2 can be reduced. Moreover, since the server 90 performs blur correction with high processing capability, blur corrected images with no frame omission can be displayed.

According to the above embodiment, the blurs in the up-and-down direction (X axis) and the left-and-right direction (Y axis) are detected by the gyro sensors. However, the blurs in a depth direction (Z axis) may be further detected, or blur caused when the camera is not steadily held only in one of these directions may be detected. Alternatively, the blur detecting unit is not limited to the gyro sensor but may be other detecting units such as acceleration sensor.

While the cellular phones providing one-to-one communication by videophone has been described in the above embodiment as an example of the invention, the invention is applicable to cellular phones which can communicate with a plurality of cellular phones simultaneously by videophone. In this case, the blur correction discussed above is performed for each transmission of shot images from the plural cellular phones in communication, and the respective shot images after correction are displayed in the corresponding parts of the display screen of the display panel 24 which has been divided by the number of cellular phones in communication. When the structure is so designed that the blur correction level can be set for each of the plural cellular phones in communication, the user can appropriately lower the correction level so as to reduce the processing load.

While the cellular phone having the videophone function has been described in the above embodiment as an example of the invention, the invention is applicable to a portable electronic device which has a function of receiving shot images in both directions for image display such as a PDA and a portable personal computer, or a shot image display system which has a function of receiving shot images in one direction for image display. For example, the shot image display system has a wide applicability including a system constituted by a shooting device for transmitting shot images and an image receiving device for displaying shot images received from the shooting device, and also a shot image display system not requiring real time processing such as a mail system where a shot image 15 attached to a mail and reproduced by the receiving side.

The entire disclosure of Japanese Patent Application No. 2006-068557, filed Mar. 14, 2006 is expressly incorporated by reference herein.

What is claimed is:

1. An image receiving device, comprising:
   a receiving unit that receives image information and blur information from a remote device over a communications network, wherein the blur information is determined by the remote device during acquisition of the image information;
   a blur detecting unit that measures blur information of the image receiving device during acquisition of the image information by the remote device and that determines a blur difference between the received blur information and the measured blur information;
   a blur correcting unit that generates corrected image information by executing blur correction on the received image information based on the blur difference; and
   a display unit that displays the corrected image information.

2. The image receiving device according to claim 1, wherein the blur detecting unit includes at least one of a gyro sensor and an acceleration sensor.

3. A portable videophone comprising:
   the image receiving device according to claim 1
   a shooting unit that acquires second image information;
   a transmitting unit that transmits the second image information to the remote device; and
   a communication unit that provides voice communication with the remote device.

4. A method of controlling an image receiving device, the method comprising:
   receiving image information from a remote device;
   receiving blur information from the remote device, wherein the blur information is determined by the remote device during acquisition of the image information;

measuring blur information of the image receiving device during acquisition of the image information by the remote device;

determining a blur difference between the received blur information and the measured blur information;

generating corrected image information by executing blur correction on the received image information based on the blur difference; and displaying the corrected image information.

5. A method of operating a server provided for a communication network, the method comprising:

receiving image information from a shooting device;

receiving first blur information from the shooting device, wherein the first blur information is determined by the remote device during acquisition of the image information;

receiving second blur information from an image receiving device, wherein the second blur information is determined by an image receiving device during acquisition of the image information by the remote device;

determining a blur difference between the first blur information and the second blur information;

generating corrected image information by performing blur correction on the image information based on the blur difference; and transmitting the corrected image information to the image receiving device.

* * * * *